(12) United States Patent
Khan et al.

(10) Patent No.: US 11,040,627 B2
(45) Date of Patent: Jun. 22, 2021

(54) VEHICLE INCLUDING FASTENER CONFIGURED TO INCREASE EASE OF RELEASING CONNECTION BETWEEN BATTERY AND FRAME

(71) Applicant: Ford Global Technologies, LLC, Dearborn, MI (US)

(72) Inventors: Ahteram Khan, Canton, MI (US); Jingmei Shen, Troy, MI (US); Ying Zhao, Canton, MI (US); Anil Reddy Pullalarevu, Northville, MI (US); Yongcai Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/671,216

(22) Filed: Nov. 1, 2019

(65) Prior Publication Data

US 2021/0129685 A1    May 6, 2021

(51) Int. Cl.
*B60K 1/04* (2019.01)
*B60L 50/64* (2019.01)
*B60L 50/60* (2019.01)

(52) U.S. Cl.
CPC .............. *B60L 50/64* (2019.02); *B60L 50/66* (2019.02); *B60K 2001/0438* (2013.01)

(58) Field of Classification Search
CPC ........... B60L 50/64; B60L 50/66; B60K 1/04
See application file for complete search history.

(56) References Cited

U.S. PATENT DOCUMENTS

| | | | |
|---|---|---|---|
| 8,393,427 B2 | 3/2013 | Rawlinson | |
| 9,290,088 B2 * | 3/2016 | Lejeune | ................. F16B 21/02 |
| 9,926,017 B1 | 3/2018 | Hamilton et al. | |
| 10,112,470 B2 | 10/2018 | Hamilton et al. | |
| 10,272,759 B2 | 4/2019 | Sudhindra et al. | |

FOREIGN PATENT DOCUMENTS

| | | |
|---|---|---|
| CN | 208978611 U | 6/2019 |
| JP | 2017132376 A | 8/2017 |

* cited by examiner

*Primary Examiner* — James A Shriver, II
*Assistant Examiner* — James J Triggs
(74) *Attorney, Agent, or Firm* — David Coppiellie; Carlson, Gaskey & Olds, P.C.

(57) ABSTRACT

This disclosure relates to a motor vehicle including a bolt configured to increase the ease of releasing a connection between a battery and a vehicle frame, and a corresponding method. An example vehicle includes a frame, a battery mounted to the frame, and a fastener forming a connection of the battery to the frame. A section of the fastener is configured to increase the ease of releasing the connection.

18 Claims, 3 Drawing Sheets

VEHICLE INCLUDING FASTENER CONFIGURED TO INCREASE EASE OF RELEASING CONNECTION BETWEEN BATTERY AND FRAME

TECHNICAL FIELD

This disclosure relates to a motor vehicle including a fastener configured to increase the ease of releasing a connection between a battery and a vehicle frame, and a corresponding method.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction batteries of electrified vehicles can include a battery pack secured to an underbody of the vehicle using fasteners, such as bolts.

SUMMARY

A motor vehicle according to an exemplary aspect of the present disclosure includes, among other things, a frame, a battery mounted to the frame, and a fastener forming a connection of the battery to the frame. A section of the fastener is configured to increase the ease of releasing the connection.

In a further non-limiting embodiment of the foregoing motor vehicle, the fastener includes a head adjacent a first end, the fastener includes a threaded shank adjacent a second end opposite the first end, and the section of the fastener is between the head and the threaded shank.

In a further non-limiting embodiment of any of the foregoing motor vehicles, the section includes a diameter less than the threaded shank and the head.

In a further non-limiting embodiment of any of the foregoing motor vehicles, the section includes a notch.

In a further non-limiting embodiment of any of the foregoing motor vehicles, the fastener is arranged such that a side of the fastener including the notch faces a side of the motor vehicle.

In a further non-limiting embodiment of any of the foregoing motor vehicles, the fastener includes a first part including the head, the fastener includes a second part including the threaded shank, and the section of the fastener includes a sliding joint connecting the first part and the second part.

In a further non-limiting embodiment of any of the foregoing motor vehicles, the sliding joint is a dovetail joint, the first part includes one of a dovetail and a dovetail slot adjacent the section, and the second part includes the other of the dovetail and the dovetail slot adjacent the section.

In a further non-limiting embodiment of any of the foregoing motor vehicles, the dovetail slot extends along an axis substantially normal to a centerline of the motor vehicle.

In a further non-limiting embodiment of any of the foregoing motor vehicles, a sleeve is arranged over the fastener and covers the dovetail joint.

In a further non-limiting embodiment of any of the foregoing motor vehicles, the head abuts a bottom of the battery.

In a further non-limiting embodiment of any of the foregoing motor vehicles, the threaded shank engages a threaded opening in the frame.

In a further non-limiting embodiment of any of the foregoing motor vehicles, the threaded shank engages a cross-member of the frame extending between side rails of the frame.

In a further non-limiting embodiment of any of the foregoing motor vehicles, a floor of the vehicle is attached to a bottom of the cross-member, and the fastener extends through the floor.

In a further non-limiting embodiment of any of the foregoing motor vehicles, the battery is configured to deliver power to an electric machine, and the electric machine converts the electric power from the battery to torque to drive wheels of the motor vehicle.

In a further non-limiting embodiment of any of the foregoing motor vehicles, the fastener is one of a plurality of fasteners connecting the battery to the frame, and each of the fasteners includes a section configured to increase the ease of releasing the battery from the frame.

A method according to an exemplary aspect of the present disclosure includes, among other things, releasing a connection formed by a fastener between a battery and a frame of a motor vehicle upon application of a force substantially normal to a centerline of the motor vehicle. The fastener includes a section between a head and a threaded shank thereof configured to increase each of releasing the connection.

In a further non-limiting embodiment of the foregoing methods, the section exhibits a lesser diameter than a diameter of the head and the threaded shank.

In a further non-limiting embodiment of any of the foregoing methods, the section includes a notch facing a direction substantially normal to the centerline of the vehicle.

In a further non-limiting embodiment of any of the foregoing methods, the fastener includes a sliding joint oriented along an axis substantially normal to the centerline of the motor vehicle.

DETAILED DESCRIPTION

This disclosure relates to a motor vehicle including a bolt configured to increase the ease of releasing a connection between a battery and a vehicle frame, and a corresponding method. An example vehicle includes a frame, a battery mounted to the frame, and a fastener forming a connection of the battery to the frame. A section of the fastener is configured to increase the ease of releasing the connection. The fastener provides a connection which accommodates heavier batteries but is also selectively releasable to avoid contact between the battery and frame. These and other benefits will be appreciated from the below description.

Figure 1:
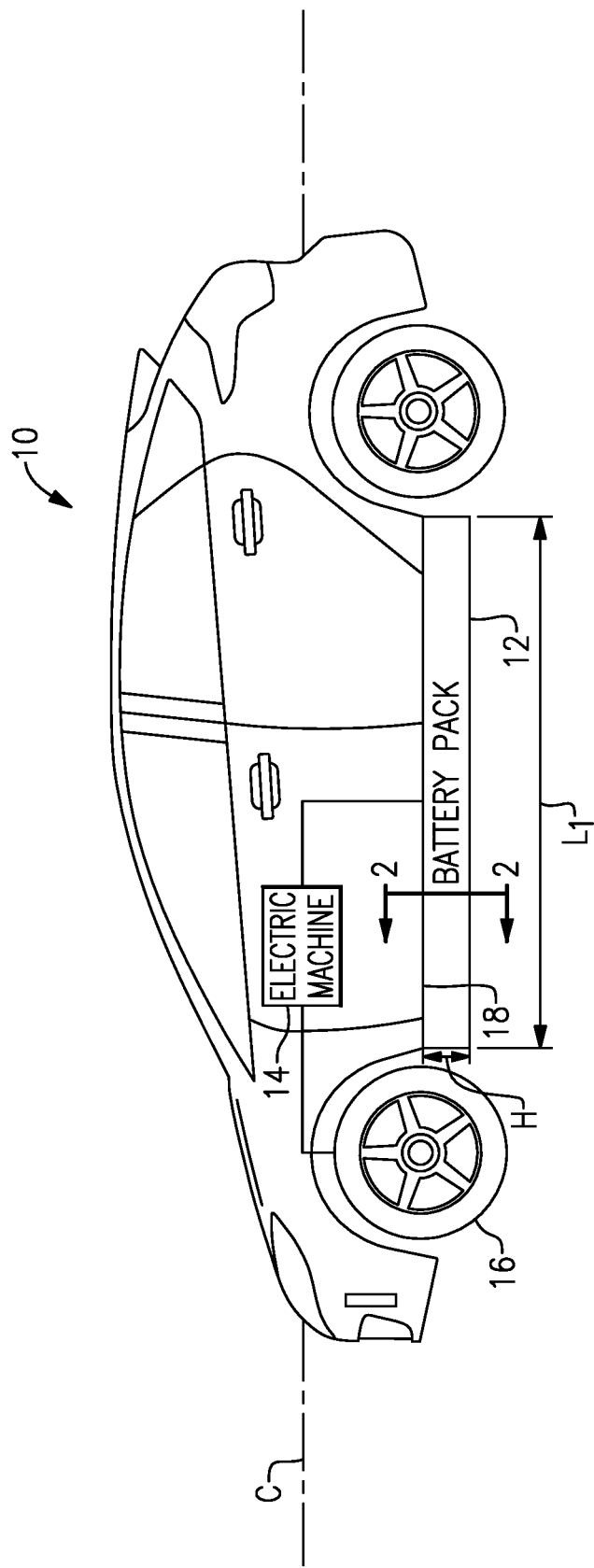
FIG. 1 is a somewhat schematic, side view of an example motor vehicle.

Referring to FIG. 1, an example motor vehicle 10 ("vehicle 10"), which in this example is an electrified vehicle, includes a battery pack 12 ("battery 12") that powers an electric machine 14. The vehicle includes wheels 16 driven by the electric machine 14. The electric machine 14 receives electric power from the battery 12 and converts the electric power to torque to drive the wheels 16. The example battery 12 may be referred to simply as a "battery," and in this example is considered a relatively high voltage (e.g., 60 $V_{DC}$, 30 $V_{AC}$) battery.

The vehicle 10 in FIG. 1 is an all-electric vehicle. In other examples, the vehicle 10 is a hybrid electric vehicle, which selectively drives wheels using torque provided by an internal combustion engine instead of, or in addition to, the electric machine 14.

Figure 2:
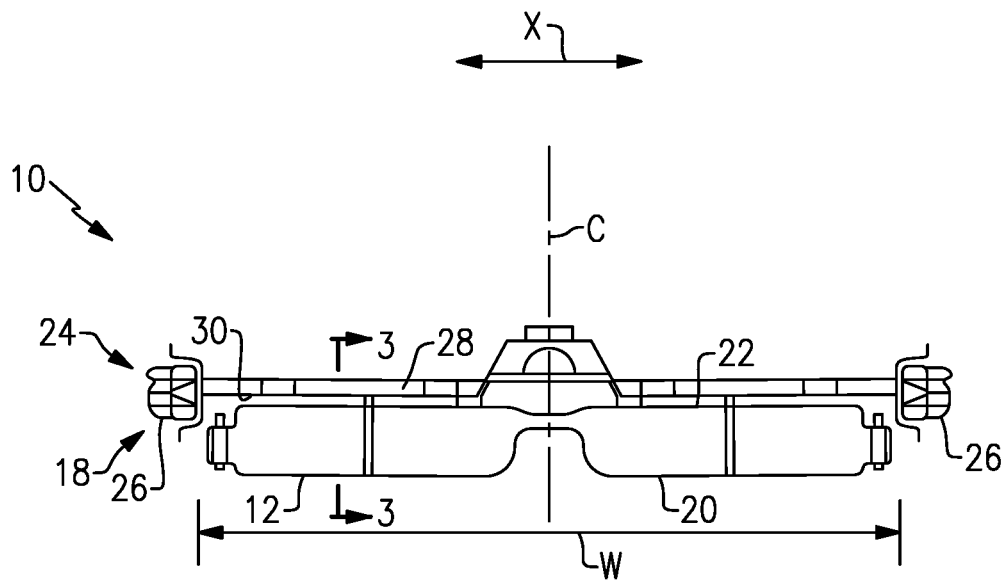
FIG. 2 is a cross-sectional view taken along line 2-2 from FIG. 1, and illustrates an example arrangement between a battery and a frame.

The vehicle 10 includes an underbody 18. The battery 12 is secured to the underbody 18 in this example. The battery 12 has a length $L_1$ that is greater than its cross-car width W (FIG. 2). The length $L_1$ extends in a direction parallel to a centerline C of the vehicle 10. In FIG. 2, the centerline C extends in and out of the page. The length $L_1$ could be less than, or equal to, the cross-car width W. The battery 12 has a relatively low height H to maintain appropriate clearances. The height H extends from a bottom surface 20 (FIG. 2) to a top surface 22 of the battery 12.

With specific reference to FIG. 2, the underbody 18 includes a frame 24 of the vehicle 10. The frame 24 (sometimes referred to as a "vehicle frame") is the main supporting structure of the vehicle 10, to which all other components are attached, either directly or indirectly. The frame 24 may be of a unibody construction, wherein the chassis and body of the vehicle are integrated into one another, or may be part of a body-on-frame construction. The frame 24 may be made of a metallic material, such as steel, carbon steel, or aluminum alloy, as examples.

The frame 24 includes a plurality of rails (sometimes referred to as "frame rails" or "beams"). FIG. 2 shows two such rails 26, which are structures extending along opposed sides of the vehicle 10. The rails are connected together by a plurality of cross-members extending in a direction X substantially normal to the centerline C. One cross-member 28 is shown in FIG. 2. A floor 30 of the vehicle 10 is attached to the bottom of the cross-member 28 in this example.

In this disclosure, the battery 12 is mounted to the underbody 18 of the vehicle 10 by a plurality of fasteners. Some fasteners may connect the battery 12 to the side rails 26. In this disclosure, one or more additional fasteners forms a mechanical connection between the battery 12 and the cross-member 28. One such fastener will now be described with reference to FIG. 3.

Figure 3:
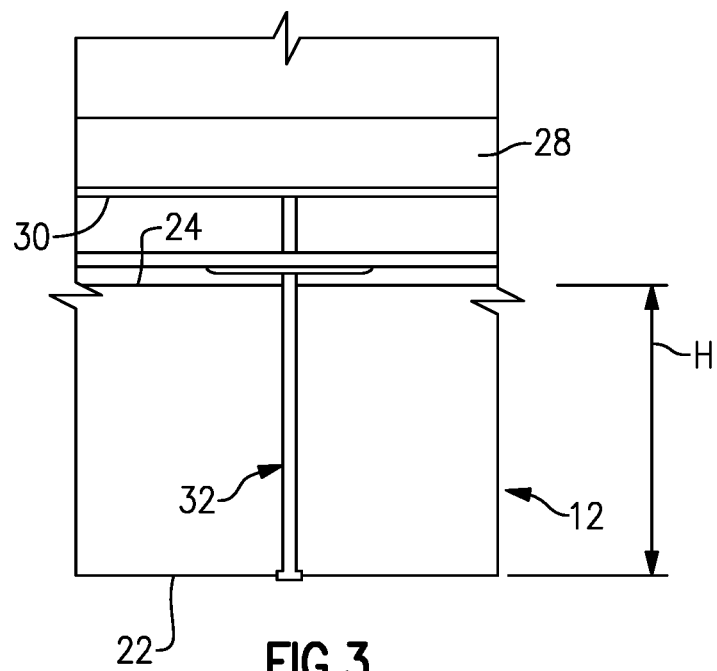
FIG. 3 is a cross-sectional view taken along line 3-3 from FIG. 2, and illustrates additional detail of the arrangement between the battery and the frame.

FIG. 3 is a cross-sectional view of a portion of the battery 12 relative to the cross-member 28. A fastener 32 forms a connection between the battery 12 and the cross-member 28. The fastener 32 generally extends from a point beneath the battery 12 to a point above the battery 12, namely the cross-member 28. The fastener 32 extends through an opening in the floor 30 as well. A portion of the fastener 32 also extends through the battery 12. The fastener 32 may extend partially within the interior of the battery 12, or the battery 12 may include an opening configured to accommodate the fastener 32.

The fastener 32 is configured to increase the ease of releasing the mechanical connection between the battery 12 and the cross-member 28 under certain conditions, such as when a force is imparted to the vehicle 10 along the direction X (FIG. 2). Releasing the mechanical connection formed by the fastener 32 permits independent movement of battery 12 relative to the cross-member 28, which prevents contact between the battery and cross-member in those conditions.

Figure 4:
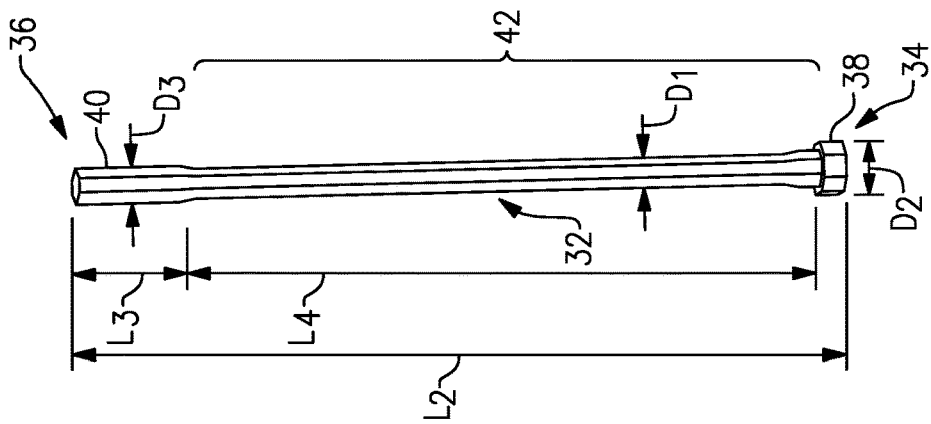
FIG. 4 illustrates an example fastener without a notch.

With reference to FIG. 4, the fastener 32 extends along a length $L_2$ between a first end 34 and a second end 36 opposite the first end. The length $L_2$ is greater than the height H. The fastener 32 is a bolt, in this example, and includes a head 38 adjacent the first end 34. The fastener 32 may be cylindrical in some examples. In other examples, the fastener 32 is at least partially non-cylindrical.

The head 38 is configured to directly abut a bottom surface 20 of the battery 12. The fastener 32 includes a threaded shank 40 adjacent the second end 36 and extending from the second end 36 by a distance $L_3$. The threaded shank 40 engages a threaded opening or socket in the cross-member 28, or may connect to the cross-member 28 via a nut. In another example, the threaded shank is not threaded and is instead welded to the cross-member 28. Other connections come within the scope of this disclosure.

Between the end of the threaded shank 40 and the head 38, across at least a portion of a distance $L_4$, the fastener 32 includes a section 42 configured to increase the ease of releasing the connection between the battery 12 and the cross-member 28 by increasing the ease of shearing the fastener 32 and breaking the mechanical connection formed by the fastener 32. In FIG. 4, the section 42 increases the ease of releasing the connection because it exhibits a lesser diameter $D_1$ than that of the head 38 ($D_2$) and the threaded shank 40 ($D_3$). In one example, the diameter $D_1$ is 6 mm whereas the diameters $D_2$ and $D_3$ are 8 mm. While 6 and 8 mm have been mentioned as example dimensions, disclosure is not limited to any particular dimensions for the fastener 32.

Figure 5:
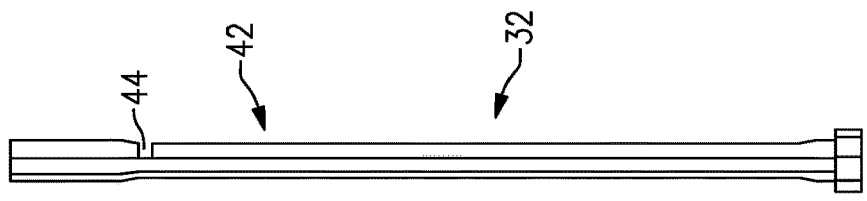
FIG. 5 illustrates the example fastener with a notch.

With reference to FIG. 5, in order to further facilitate release of the mechanical connection in response to a force along the direction X, the fastener 32 may include a notch 44 within the section 42. The notch 44, in this example, is an indentation in the outer surface of the section 42 and extends partially through the fastener 32. When assembled, the fastener 32 is arranged such that the notch 44 is arranged above the upper surface 24 of the battery 12 but below cross-member 28. Further, when mounting the fastener 32 to the vehicle 10, the side of the fastener 32 including the notch 44 faces in a direction parallel to the direction X. In this way, the notch 44 facilitates release of the mechanical connection when a force is applied in a direction parallel to the direction X.

Figure 7:
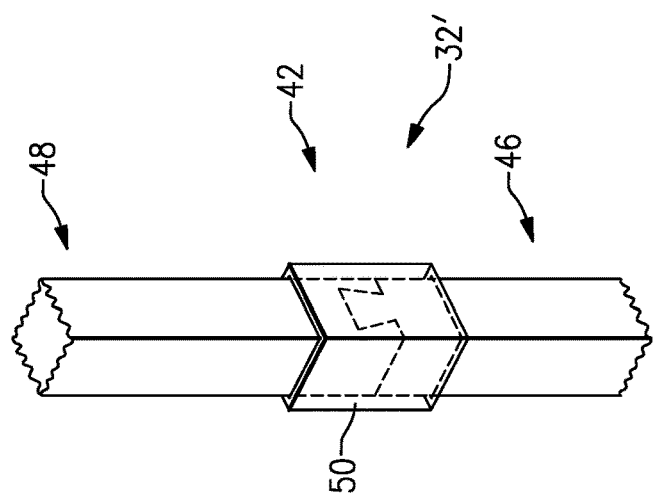
FIG. 7 is an assembled view of the portion of the fastener of FIG. 6.
Figure 6:
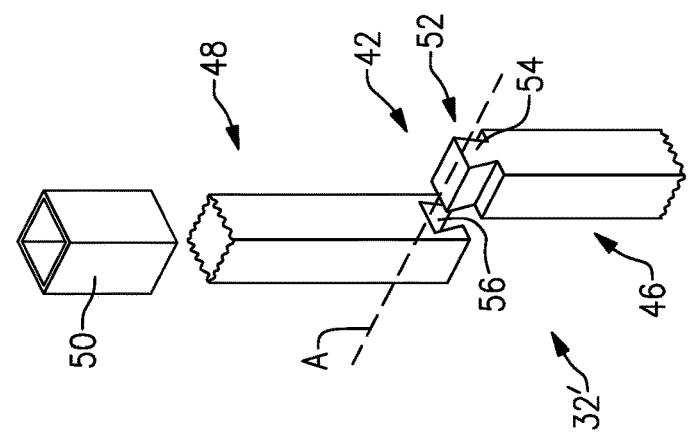
FIG. 6 is an exploded view of a portion of another example fastener.

FIG. 6 illustrates another embodiment of this disclosure. In FIG. 6, the fastener 32' includes a first part 46, a second part 48, and a sleeve 50. FIG. 6 illustrates the section 42 of this embodiment of the fastener 32' in an exploded view. FIG. 7 is an assembled view. While not shown in FIG. 6, the first part 46 includes the head 38 and the second part 48 includes the threaded shank 40. In this example, the section 42 is non-cylindrical in cross-section. Specifically, the section 42 is rectangular in cross-section. The entire fastener 32' may be rectangular in cross-section.

The section 42 includes a sliding joint 52 connecting the first and second parts 46, 48. The sliding joint 52 is configured to attach the first and second parts 46, 48 together by sliding one relative to the other. The sliding joint 52 permits relative movement of the first and second parts 46, 48 in one direction, but restricts relative movement in other directions such as along a length of the fastener 32'. While a sliding joint is discussed herein, this disclosure extends to other joints providing selective detachment.

In this example, the sliding joint 52 is a dovetail joint. The first part 46 includes a dovetail 54 and the second part 48 includes a dovetail slot 56 sized and shaped to receive the dovetail 54. It should be understood that the first part 46 could include a dovetail slot and the second part 48 could include a dovetail, however. The dovetail slot 56 extends through the second part 48 along an axis A. When the fastener 32' is mounted to the vehicle 10, the fastener 32' is arranged such that the axis A is parallel to the direction X. The sleeve 50 is arranged over the sliding joint 52 and prevents unintentional separation of first and second parts 46, 48 at the sliding joint 52, while permitting relative movement between the first and second parts 46, 48, and disconnection of the first and second parts 46, 48, when a substantially large force is applied along the direction X. The sleeve 50 may be made of an elastomeric material in one example.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a frame;
a battery mounted to the frame; and
a fastener including a head adjacent a first end of the fastener and a threaded shank adjacent a second end of the fastener opposite the first end, wherein the fastener forms a connection of the battery to the frame, and wherein a section of the fastener between the head and the threaded shank includes one of (1) a notch facing a side of the motor vehicle, or (2) a sliding joint connecting first and second parts of the fastener.

2. The motor vehicle as recited in claim 1, wherein the section includes a diameter less than the threaded shank and the head.

3. The motor vehicle as recited in claim 1, wherein the section includes the notch facing the side of the motor vehicle.

4. The motor vehicle as recited in claim 1, wherein:
the section of the fastener includes the sliding joint,
the first part of the fastener includes the head, and
the second part of the fastener includes the threaded shank.

5. The motor vehicle as recited in claim 4, wherein:
the sliding joint is a dovetail joint,
the first part includes one of a dovetail and a dovetail slot adjacent the section, and
the second part includes the other of the dovetail and the dovetail slot adjacent the section.

6. The motor vehicle as recited in claim 5, wherein the dovetail slot extends along an axis substantially normal to a centerline of the motor vehicle.

7. The motor vehicle as recited in claim 5, wherein a sleeve is arranged over the fastener and covers the dovetail joint.

8. The motor vehicle as recited in claim 1, wherein the head abuts a bottom of the battery.

9. The motor vehicle as recited in claim 8, wherein the threaded shank engages a threaded opening in the frame.

10. The motor vehicle as recited in claim 9, wherein the threaded shank engages a cross-member of the frame extending between side rails of the frame.

11. The motor vehicle as recited in claim 9, wherein a floor of the vehicle is attached to a bottom of the cross-member, and the fastener extends through the floor.

12. The motor vehicle as recited in claim 1, wherein the battery is configured to deliver power to an electric machine, and wherein the electric machine converts the electric power from the battery to torque to drive wheels of the motor vehicle.

13. The motor vehicle as recited in claim 1, wherein the fastener is one of a plurality of fasteners connecting the battery to the frame, wherein each of the fasteners includes a section including one of (1) a notch facing a side of the motor vehicle, or (2) a sliding joint connecting first and second parts of the fastener.

14. A motor vehicle, comprising:
a frame including two side rails and a cross-member extending between the side rails;
a floor attached to the cross-member;
an electric machine;
a battery mounted to the frame, wherein the battery is configured to deliver power to the electric machine, and wherein the electric machine converts the electric power from the battery to torque to drive wheels of the motor vehicle; and
a plurality of fasteners each forming a connection of the battery to the frame, wherein each of the fasteners includes a head adjacent a first end and a threaded shank adjacent a second end opposite the first end, wherein each fastener includes a section between the head and the threaded shank including one of (1) a notch facing a side of the motor vehicle, or (2) a sliding joint connecting first and second parts of the fastener, wherein the head of each fastener abuts a bottom surface of the battery and the threaded shank is above a top surface of the battery, wherein each fastener extends through the floor.

15. A method, comprising:
releasing a connection formed by a fastener between a battery and a frame of a motor vehicle upon application of a force substantially normal to a centerline of the motor vehicle, wherein the fastener includes a section between a head and a threaded shank including one of (1) a notch facing a side of the motor vehicle, or (2) a sliding joint connecting first and second parts of the fastener.

16. The method as recited in claim 15, wherein the section exhibits a lesser diameter than a diameter of the head and the threaded shank.

17. The method as recited in claim 15, wherein the section includes the notch and the notch faces a direction substantially normal to the centerline of the vehicle.

18. The method as recited in claim 15, wherein the section includes the sliding joint, and the sliding joint is oriented along an axis substantially normal to the centerline of the motor vehicle.

* * * * *